Patented Oct. 17, 1950

2,526,073

UNITED STATES PATENT OFFICE 2,526,073

CERAMIC METHOD AND COMPOSITION

Walter E. Gardner, Whittier, Calif.

No Drawing. Application March 23, 1946,
Serial No. 656,774

7 Claims. (Cl. 106—40)

The present invention relates to ceramic methods and compositions and has to do with a means whereby tile, brick, blocks and the like may be produced and when so produced will be light in weight yet capable of bearing large loads, and which ceramic articles have the advantage of being insulative in nature, water repellent and advantageous from an acoustical standpoint.

The product of the present invention not only has all the desirable properties of old-type bricks, tile and the like, but has the added advantage of light weight. While the invention lends itself to either cold or hot working in various products, the present invention is more specifically directed to fired articles.

Wherever the word "ceramic" is used in this specification, I intend to have the word applied primarily to a product in the manufacture of which a high temperature treatment is involved, and secondarily to a product customarily manufactured entirely or chiefly from raw materials of an earthy nature. Hence the term will include structural items such as common brick, paving brick, floor tile and the like, refractories such as fireclay brick, pottery of all forms, glass, etc. Thus the term will apply whether the bonding factor be a clay or a ceramic bond as it is generally understood.

An object of the invention is to provide a method of obtaining in a ceramic body small interlocking cells to form a honeycomb of round or cylindrical spaces, and thereby to give the ceramic body insulative and acoustical properties.

A further object of my invention is to provide a fired ceramic ware which is resistant to weathering, thermal shock, abrasion, erosion, slagging, discoloration, efflorescence, chemical attack by gases or liquid, or fungus growth.

Other objects include a method of forming a product which is readily workable, inexpensive and generally superior to ceramic products and methods now known to the inventor.

In the practice of the invention, I have found that certain altered rock may be used to advantage in the attaining of the objects as heretofore set forth for this invention. In experiments that I have conducted I have found that rhyolitic rock may be used to advantage. This rhyolitic rock is of extrusive form by volcanic action and is a fine-grained equivalent of granite. I may use pitchstone and pearlite, and in some cases obsidian. The essential requirement is in the amount of combined water, and rock of the character under discussion which contains less than ½ of 1% of combined water is not usable; while rock that has a combined water of 6–7% or higher is satisfactory and may be used successfully. Rock of this character weighs between 67 and 68 pounds per cubic foot, and after treatment as hereinafter disclosed, the material weighs approximately 5 to 6 pounds per cubic foot. Assuming that I use rhyolitic rock having a combined water content greater than ½ of 1%, the rock is first crushed in any approved manner to bring it to 10 mesh or finer in size. This rock is suddenly subjected to a flame of intense heat in a furnace, which explodes the rock. Instead of a dense rock, there is after the exploding operation, a material that is light, hollow and globular in structure, with a volume change of 6 to 7 times that of the original rock. The amount of heat necessary to explode this rock is easily determined by the results obtained. Different heats will of necessity have to be used, depending upon the water of crystallization in the rhyolitic rock, and a higher heat to explode the same would be required in the furnace if the water of crystallization was ½ of 1% than if it was 6 to 7%. This exploded product may be collected in the usual manner as to grades, which of necessity will vary in the same manner as the rock size will vary when crushed. Thus there will be a flour size as well as larger sizes. This particular material when combined with other ingredients and properly fired, will chemically combine with the other materials to form in the other materials a honeycomb of interstitial voids. Furthermore, the rhyolitic rock after the exploding thereof changes from a gray rock to one that is white in color.

By way of example, I may form a body mix having high insulative values in the following manner:

*Example #1*

|  | Per cent by weight |
|---|---|
| Exploded rhyolitic rock | 25 |
| Santa Monica clay (red) | 50 |
| Rhyolitic clay | 25 |
|  | 100 |

This material may be combined, as may likewise other materials as hereinafter set forth, by utilizing the following procedures: Proper bonding material is first selected, such as the use of a clay of some form. This bond acts to hold the exploded rhyolitic rock together. The materials are mixed in a dry state and approximately 8% of water is added. The batch is again thoroughly mixed until the water is thoroughly incorporated. Thereafter the batch is screened and ready to be formed or pressed into the desired ceramic product. Other methods may be utilized, such as the slip casting method, the general procedure of which is to add water to the blunger, followed by the addition of deflocculents, then the clay selected together with the exploded rhyolitic rock, after which the entire body is blunged. Thereafter the material is ready to be cast into the desired shape. Clays which may be used, by way of example, are Kentucky and Tennessee ball clays, the ball clays of Dorsetshire, England, and clays having similar characteristics.

In extruding this material, by whatever method used, it is important that sufficient clay be used, to the end that the body during extrusion will not crack or tear.

The material set forth in Example 1 has a red body, and as stated, has both insulative and acoustical properties. While the exploded rhyolitic rock is only 25% by weight of the body, yet this rock occupies a volume many times that of the rest of the ingredients.

I may form a light weight white insulating and acoustical material in the following manner:

*Example #2*

| | Per cent by weight |
|---|---|
| Exploded rhyolitic rock | 35 |
| Rhyolitic clay | 30 |
| Kaolin | 25 |
| Talc | 10 |
| | 100 |

The resulting body following Example 2 is lighter in weight than is Example 1, and it is white in color. In addition, it has both insulating and acoustical values as well as great strength.

The exploded rhyolitic rock has shown a thermal conductivity of .35 B. t. u. per hour, and a square foot of temperature gradient of 1° F. per inch thickness. Thus the insulating value is greater than some standard insulators now in the market.

In firing Example 1 in the furnace, after the body has been pressed into the desired ceramic form or cast, reasonable care must be exercised as to temperature range. I have found that the temperature of firing depends on the nature and amount of the bond employed. The more refractory the bond, or the greater the amount thereof, the higher the temperature necessary to unite the exploded rhyolitic rock therewith. Insufficient heat treatment forms a weak body, while overheating promotes deformation. A proper degree of heat gives the body high strength, with good openwork structure and resulting insulative and acoustical properties. The mix of Example 1 may be fired at 1840° F. to secure a product, regardless of its pressed or extruded form, which will be of a predetermined size, without warp, which will be strong and have all the characteristics set forth in the objects of the present invention.

As to Example 2, a firing temperature of 1900° F. is sufficient. Generally, I may state that as to any example for a body mix as hereinafter set forth, the firing range lies between 1750° F. and 2200° F.

As a further example of use of the exploded rhyolitic rock for roof tile, the following is given:

*Example #3*

| | Per cent by weight |
|---|---|
| Exploded rhyolitic rock | 40 |
| Fire clay | 54 |
| Talc | 6 |
| | 100 |

The materials set forth in Example 3 are preferably engobe treated and glazed prior to firing. I may use as an engobe the following: The body, set forth in Example 3, 75%; glaze 25%. The body of Example 3 would have a surface filled with pin holes and craters. Therefore, to cover the surface, the engobe is used as a coating material, and the glaze is applied thereover, with the result that the surface is free from pin holes and other defects.

Generally, I may state that in combining the body mix I use various amounts of plastic clays and other ceramic material combined with an excess by volume of the exploded rhyolitic rock. The clay or bonding proportion of the mix is selected in accordance with the ultimate product desired, but in general the mineralogical composition of all products is somewhat similar, the difference lying in the amount and type of bond used. The material is fired to such a temperature, that is, between 1750° F. and 2200° F., that the hollow ball-like crystals of the exploded rhyolitic rock unite or combine with the clay or ceramic bond without any deformation or failure of the material as a whole, resulting in a honeycomb of round voids in the finished product. The uniting or combining action of the rhyolitic rock with the bond gives a certain amount of vitrification to the body, which together with the round honeycomb structure accounts for its high strength. Furthermore, the cell structure of the exploded rhyolitic rock tends to give the ceramic products of the invention elasticity. In case of strain, the cell structure will bend or give without cracking. Exploded rhyolitic rock is non-combustible, and will not burn under any conditions of heat or fire.

The various materials given in the examples aforesaid may be made decorative in various manners which are generally known in the ceramic art, such as by adding a colored clay, or metallic salts or oxides to the initial body mix. Glaze colors may be applied to the surface of the material. I have found that the utilization of such materials will not harm in the least the strength, insulative or acoustical properties of the mixes set forth in the examples.

After firing the various bodies utilizing the exploded rhyolitic rock, together with a binding medium such as a ball clay, I have found that the body may be subjected to tests which with ordinary tile, brick and the like would completely destroy the same. I have found that the material of the present invention combined as set forth will stand after immersion in water a continuous cycle of 25 thawings and freezings.

I have applied a second test, which consists of heating the material white hot, immediately quenching it in water, and without allowing it to dry, quickly heating it to a white hot condition, followed by another quenching. This has been repeated 15 times consecutively without the material showing any signs of spalling or other failure.

The material shows a compression strength of 1200 pounds per square inch, which is greater than the standards required for common red brick and is far superior to other porous insulative and acoustical brick of the same factors.

I am aware that there are other methods of testing for strength, such as a transverse breaking thereof; but in every instance and regardless of the method used, the material when properly fired shows a strength comparable with if not greater than that of other ceramic articles.

I claim:

1. The method of producing a ceramic product which consists in first heat-exploding rhyolitic rock having a combined water content between 0.5% and about 7%, then combining it with about 7% to about 75% by weight of clay in a volume less than the volume of the rock, and thereafter firing the mass at a maturing temperature.

2. The method of producing a ceramic material which consists in combining heat-exploded rhyolitic rock of a globular formation with a lesser volume of clay, and firing the mass at a maturing temperature, the proportion of clay being from about 7% to about 75% by weight.

3. The method of producing a ceramic material which consists in first exploding a crushed rhyolitic rock into small spheres by heat, mixing a lesser volume of clay therewith, and firing the mass at a maturing temperature, the proportion of clay being from about 7% to about 75% by weight.

4. The method of producing a ceramic material which consists in first heat-treating a crushed rhyolitic rock to explode the same into small spheres, mixing therewith from about 7% to about 75% by weight of clay, and firing the mixture between temperatures of 1750° F. and 2200° F.

5. A ceramic product resulting from the firing at a maturing temperature of hollow ball-like particles of exploded rhyolitic rock and a bond comprising from about 7% to about 75% by weight of clay.

6. A ceramic product resulting from the firing at a maturing temperature of from about 7% to about 75% by weight of a plastic clay combined with a greater volume of hollow ball-like particles of exploded rhyolitic rock.

7. A ceramic product resulting from the firing at a maturing temperature of exploded rhyolitic rock in the form of hollow ball-like particles between 25% and 40% by weight, and the remainder by weight of a bonding agent comprising clay.

WALTER E. GARDNER.

REFERENCES CITED

The following references are of record in the file of this patent:

UNITED STATES PATENTS

| Number | Name | Date |
| --- | --- | --- |
| 461,980 | Miksch | Oct. 27, 1891 |
| 2,388,060 | Hicks | Oct. 30, 1945 |

FOREIGN PATENTS

| Number | Country | Date |
| --- | --- | --- |
| 1,492 | Great Britain | 1863 |
| 1,032 | Great Britain | 1879 |
| 14,635 | Great Britain | 1889 |